US006810440B2

(12) United States Patent
Micalizzi, Jr. et al.

(10) Patent No.: US 6,810,440 B2
(45) Date of Patent: Oct. 26, 2004

(54) METHOD AND APPARATUS FOR AUTOMATICALLY TRANSFERRING I/O BLOCKS BETWEEN A HOST SYSTEM AND A HOST ADAPTER

(75) Inventors: Charles Micalizzi, Jr., San Juan Capistrano, CA (US); Dharma R. Konda, Aliso Viejo, CA (US); Chandru M. Sippy, Irvine, CA (US)

(73) Assignee: Qlogic Corporation, Aliso Viejo, CA (US)

( * ) Notice: Subject to any disclaimer, the term of this patent is extended or adjusted under 35 U.S.C. 154(b) by 0 days.

(21) Appl. No.: 10/375,643

(22) Filed: Feb. 27, 2003

(65) Prior Publication Data

US 2003/0126322 A1 Jul. 3, 2003

Related U.S. Application Data

(62) Division of application No. 09/328,738, filed on Jun. 9, 1999, now Pat. No. 6,564,271.

(51) Int. Cl.[7] .................. G06F 13/12; G06F 13/00; G06F 13/38; G06F 3/00; G06F 12/00
(52) U.S. Cl. .................. 710/19; 710/7; 710/20; 710/39; 710/52; 710/53; 710/56; 710/57; 710/62; 710/72; 710/74; 711/1; 711/100; 711/150
(58) Field of Search .................. 710/1, 3, 5, 7, 710/20, 22, 33, 39, 46, 48, 52, 53, 56, 57, 62, 72, 74, 260, 263, 19, 35; 711/1, 100, 147, 150

(56) References Cited

U.S. PATENT DOCUMENTS

| | | |
|---|---|---|
| 4,333,143 A | 6/1982 | Calder |
| 4,449,182 A | 5/1984 | Rubinson et al. ........... 709/236 |
| 4,549,263 A | 10/1985 | Calder |
| 4,777,595 A | 10/1988 | Strecker et al. ............. 709/236 |
| 4,783,730 A | 11/1988 | Fischer |
| 4,783,739 A | 11/1988 | Calder |
| 4,803,622 A | 2/1989 | Bain, Jr. et al. |
| 5,212,795 A | 5/1993 | Hendry |
| 5,249,279 A | 9/1993 | Schmenk et al. ............... 710/5 |
| 5,276,807 A | 1/1994 | Kodama et al. |
| 5,321,816 A | 6/1994 | Rogan et al. |
| 5,347,638 A | 9/1994 | Desai et al. |
| 5,371,861 A | 12/1994 | Keener et al. |
| 5,448,702 A | 9/1995 | Garcia et al. ................. 710/36 |
| 5,758,187 A | 5/1998 | Young |
| 5,828,903 A | 10/1998 | Sethuram et al. ............. 710/53 |
| 5,905,905 A | 5/1999 | Dailey et al. |
| 5,968,143 A | 10/1999 | Chisholm et al. |
| 5,983,292 A | 11/1999 | Nordstrom et al. |
| 6,049,802 A | 4/2000 | Waggener, Jr. et al. ..... 707/100 |
| 6,078,970 A | 6/2000 | Nordstrom et al. ........... 710/19 |
| 6,115,761 A * | 9/2000 | Daniel et al. .................. 710/57 |
| 6,185,620 B1 | 2/2001 | Weber et al. ................ 709/230 |
| 6,233,244 B1 * | 5/2001 | Runaldue et al. ........... 370/412 |
| 6,269,413 B1 | 7/2001 | Sherlock ....................... 710/52 |
| 6,434,630 B1 * | 8/2002 | Micalizzi et al. ............... 710/5 |
| 6,463,032 B1 * | 10/2002 | Lau et al. .................... 370/218 |
| 6,504,846 B1 * | 1/2003 | Yu et al. ...................... 370/412 |
| 6,546,010 B1 * | 4/2003 | Merchant et al. ........... 370/389 |

* cited by examiner

Primary Examiner—Jeffrey Gaffin
Assistant Examiner—Tanh Q. Nguyen
(74) Attorney, Agent, or Firm—T J Singh, Klein, O'Neill & Singh, LLP

(57) ABSTRACT

An input/output (I/O) host adapter in an I/O system processes I/O requests from a host system to a plurality of I/O devices. The host adapter includes a circuit to automatically transfer I/O requests from host memory to adapter memory. The host adapter also includes a circuit to automatically transfer I/O responses from adapter memory to host memory.

6 Claims, 7 Drawing Sheets

FIG. 5 INBOUND

OUTBOUND

OUTBOUND

METHOD AND APPARATUS FOR AUTOMATICALLY TRANSFERRING I/O BLOCKS BETWEEN A HOST SYSTEM AND A HOST ADAPTER

RELATED APPLICATIONS

This application is a divisional of application Ser. No. 09/328,738, filed Jun. 9, 1999, now U.S. Pat. No. 6,564,271, issued May 13, 2003.

BACKGROUND OF THE INVENTION

1. Field of the Invention

The present invention relates generally to a computer system. Specifically, the present invention relates to a host adapter which reduces the processing demand on the local processor when processing input/output (I/O) requests from a host microprocessor.

2. Brief Description of the Related Art

In a computer system, a host microprocessor (host system) or central processing unit (CPU) retrieves information from a peripheral I/O device, such as a disk drive, by sending an I/O request to a host adapter. The host adapter processes the I/O requests intended for the peripheral I/O device. Generally, more than one I/O device is available to the host adapter. Further, most host adapters can simultaneously handle multiple I/O requests from the host microprocessor to multiple I/O devices. The host adapter includes a processor to process several low-level commands associated with each I/O request. For example, for I/O devices attached to a small computer system interface (SCSI) bus, a single I/O request may include commands to arbitrate for the SCSI bus, commands to select the target I/O device, commands to request data transfer, commands to disconnect and reconnect the I/O device from the SCSI bus, and other commands to change the SCSI bus state.

If the host microprocessor sends a large number of I/O requests, i.e., the I/O workload is high, the adapter processor needs to process a large number of requests. Before processing the requests, the frames containing the requests must be moved to memory used by the host adapter to store pending requests. Generally, the adapter processor is used to facilitate the transfer of the I/O requests from the host system to the host adapter memory area. In some configurations, the host system dedicates areas in host memory as a request queue and as a response queue., The request queue is used to facilitate the transfer of I/O requests from the host system to the host adapter. The response queue is used to facilitate the transfer of I/O command completion status information from the host adapter to the host system. In this configuration, the adapter processor is used to monitor and move frames to and from the queues in host memory. When a large number of I/O requests are issued and processed, the overhead (caused by the need for the adapter processor to move the data) can significantly reduce the throughput of the adapter processor in setting up the actual I/O operation. The reduction in throughput of the processor adversely affects the performance of the host adapter. As existing host microprocessors are designed to be faster, the slowdown in system performance, due to the adapter processor taking time to transfer and process the requests, is even more noticeable.

The rate at which peripheral I/O devices process I/O requests has increased along with the increase in host processor speed. The higher rate has led to a greater need for the host adapter to rapidly process I/O requests so as to fully utilize the faster I/O devices such as Fibre Channel devices. Thus, there has been a greater demand for the processing power used to process I/O requests and responses. Therefore, there is a need for a method of facilitating the transfer of I/O requests and responses between a host adapter and a host system, which reduces the load on the adapter processor.

SUMMARY OF THE INVENTION

One aspect of the present invention is a method of automatically loading I/O command blocks and I/O status blocks to and from buffers that are used by a processor on a host adapter to store I/O command blocks and I/O status blocks. The method for loading I/O command blocks to the adapter buffers monitors a request queue to determine when a new command is in the request queue. A buffer address is then retrieved from a list of available buffer locations. The data from the request queue is transferred from the host system to the adapter buffer at the location pointed to by the retrieved address. Once the data is transferred to the buffer, the address of the buffer is written to a filled buffer locations list. The adapter processor can then read the I/O command block by using the address from the filled list to retrieve the data from the buffer.

Another aspect of the present invention is a method for retrieving I/O status blocks from host adapter buffers. The method monitors a list of response buffers in adapter RAM, which contain I/O status blocks. An I/O status block buffer address is determined from a list of filled response buffers. The I/O status block is then transferred from the adapter RAM to a response queue in host memory. Finally, the buffer address is written to a free buffer location list to make the buffer available for another I/O status block. The adapter processor writes I/O status blocks containing response information to the buffers identified by the free list entries.

BRIEF DESCRIPTION OF THE DRAWINGS

The foregoing features and other features of the present invention will now be described with reference to the drawings of a preferred embodiment of a host bus adapter. In the drawings, the same components have the same reference numerals. The illustrated embodiment is intended to illustrate, but not to limit the invention. The drawings include the following figures, wherein.

DETAILED DESCRIPTION OF THE PREFERRED EMBODIMENT

To facilitate an understanding of the preferred embodiment, the general architecture and operation of a computer system that includes a host bus adapter will initially be described. The specific architecture and operation of the preferred embodiment will then be described with reference to the general architecture and operation of a host bus adapter.

Figure 1:
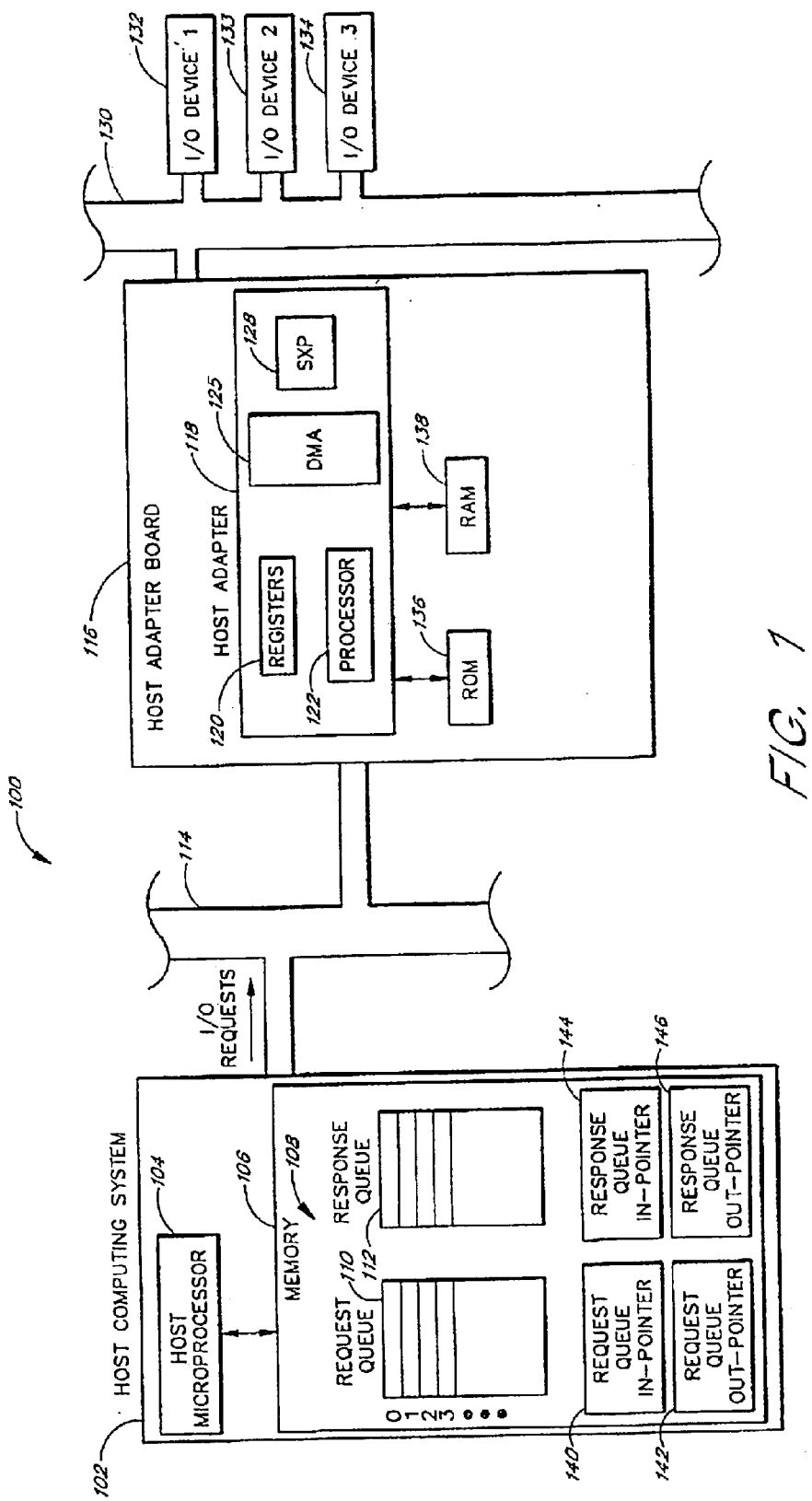
FIG. 1 illustrates a computer system comprising a host computing system, a number of peripheral I/O devices and a host bus adapter.

FIG. 1 illustrates a computer system 100 in accordance with one embodiment of the present invention. The computer system 100 comprises a host computing system 102, a first bus 114, a host bus adapter 116, a second bus 130, and a number of peripheral I/O devices 132–134.

The host system 102 of comprises a host microprocessor 104 and a memory 106. At least a part of the memory 106, such as the request queue 110 and the response queue 112, is shared memory between the host microprocessor 104 and the host bus adapter 116. The request queue 110 and the response queue 112 store command and status information related to I/O requests and I/O responses.

The first and second buses 114, 130 may be called system buses, I/O buses, or network buses. In one configuration, the first bus 114 is a peripheral component interconnect (PCI) bus and the second bus 130 is a Fibre Channel. The Fibre Channel may be configured in accordance with a Small Computer Standard Interface (SCSI) command format. The second bus 130 may also be any other type of SCSI bus. The first bus 114 provides communication between the host system 102 and the host bus adapter 116. The second bus 130 provides communication between the host bus adapter 116 and the I/O devices 132–134.

The host bus adapter 116 may be configured to transmit and receive differential signals, SCSI single-ended signals, or Fibre Channel signals. The host bus adapter 116 comprises a host adapter 118, a read-only memory (ROM) 136 and a random-access memory (RAM) 138. The ROM 136 may be configured as a flash programmable ROM (PROM) which stores bootable code.

The host adapter 118 comprises a processor 122, a Direct Memory Access (DMA) controller 125, and a SCSI executive protocol (SXP) engine 128. In one configuration, the processor 122 is a reduced instruction set computer (RISC) processor.

The DMA controller usually controls several DMA channels that are used for transferring data to and from the adapter RAM without the adapter processor 122 intervention. In the illustrated embodiment, the DMA controller controls a command DMA channel 124, which is used for command transfers, and a data DMA channel 126, which is used for data transfers.

The ROM 136 stores RISC code or firmware that is downloaded to the RAM (i.e., initialized and loaded or configured) by the software driver in host memory 106 or the bootable (flash) code in adapter board ROM 136 at boot-up time. The firmware is executed by the processor 122 to process I/O requests and I/O commands from the host microprocessor 104. The SXP engine 128 handles low-level commands associated with I/O requests.

The peripheral I/O devices 132–134 may be tape drives, disk drives, video disk drives (VDD), digital video disks (DVD), Redundant Arrays of Inexpensive/Independent Disks (RAID), CD-ROMs, scanners, and printers.

The general use and operation of the computer system 100 is described with reference to FIG. 1. The host microprocessor 104 stores I/O requests intended for the peripheral I/O devices 132–134 in the request queue 110. The host adapter 118 retrieves the I/O requests from the request queue 110 via the PCI bus 114. In one configuration, the host adapter 118 reads the I/O requests from the host memory 106 via direct memory access (DMA). The host adapter 118 can manage multiple I/O operations and data transfers without intervention from the host microprocessor 104.

The processor 122 parses the I/O requests and sets up the I/O operation by programming the SXP engine 128. The I/O requests are then executed by sending commands via the SCSI bus 130 to the peripheral I/O devices 132–134 to retrieve or store the requested data. In one configuration, the host adapter 118 sends or retrieves requested data to or from the host memory 106 via a DMA operation.

Figure 2:
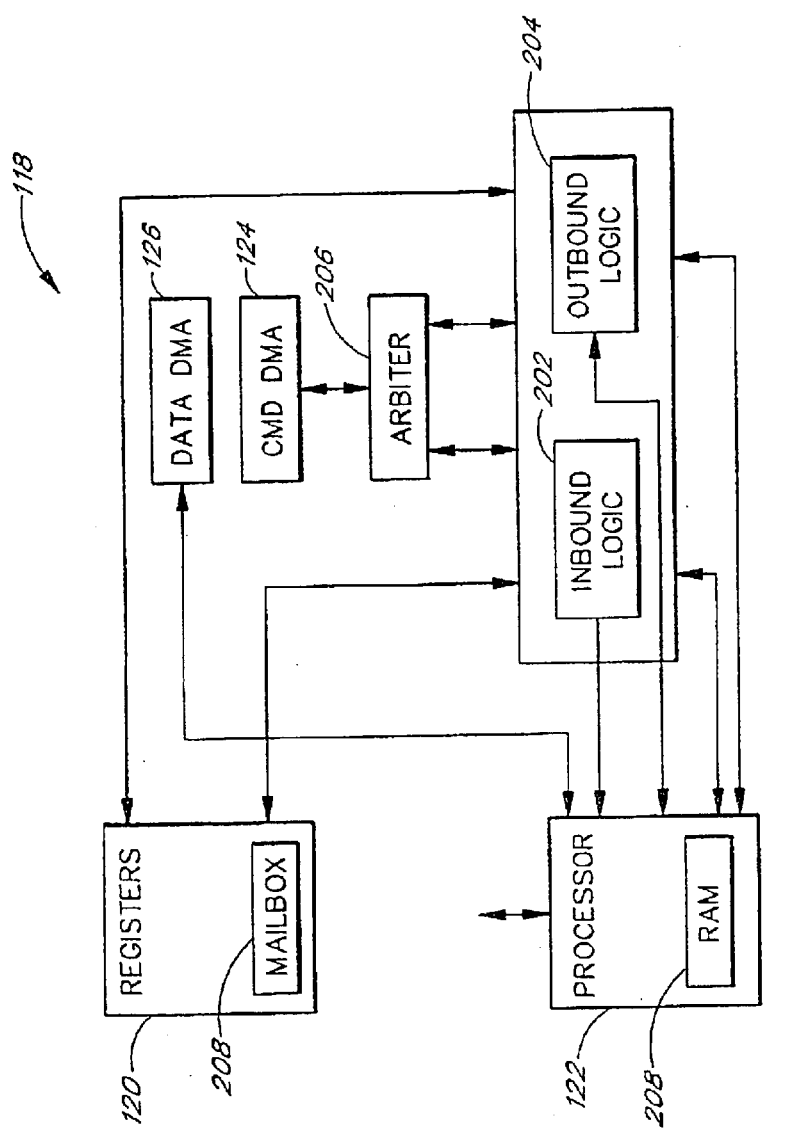
FIG. 2 illustrates the I/O command processing portion of a host bus adapter.

FIG. 2 illustrates components associated with the I/O command transfer automation portion of the host adapter 118. The host adapter 118 is coupled to the first bus 114 through a pair of DMA channels 124, 126. The command DMA channel 124 is used to transfer I/O command information to and from the host memory 108. The command DMA channel 124 is coupled to an inbound logic circuit 202 (inbound logic) and an outbound logic circuit 204 (outbound logic) through a path that is controlled by an arbiter 206. The arbiter 206 ensures that both the inbound logic 202 and the outbound logic 204 have substantially equal access to the command DMA channel 124 and the data DMA channel 126. The inbound logic 202 and the outbound logic 204 are coupled to the adapter RAM 138. The inbound logic 202 and the outbound logic 204 are also coupled to mailbox registers 208 in the adapter register set 120. The adapter processor 122 is coupled to the adapter RAM 138 and to the adapter register set 120. The adapter processor 122 is further coupled to the inbound logic 202 and to the outbound logic 204 so as to update pointer values in the filled list or the free list that is associated with a logic unit.

Figure 3:
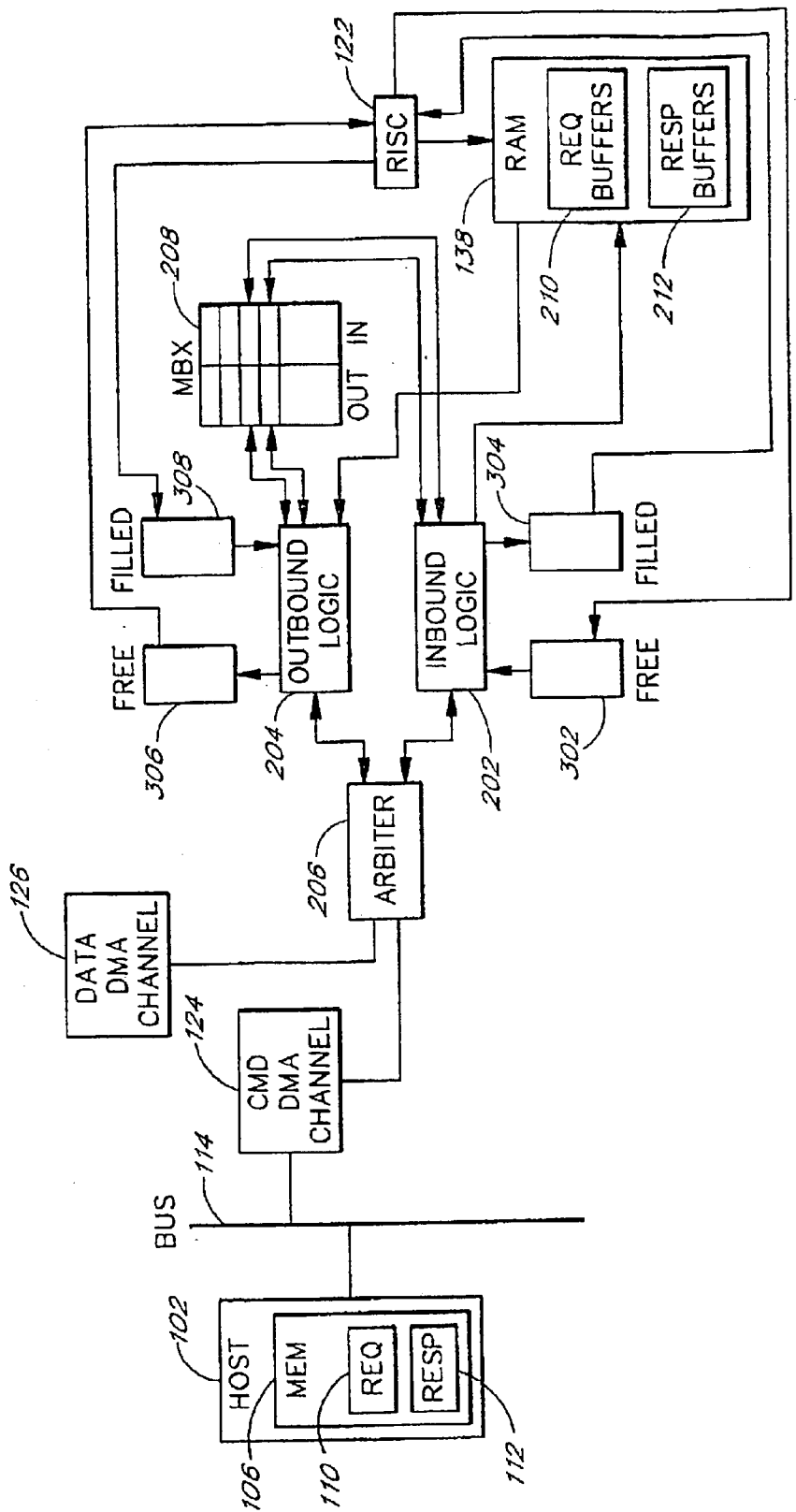
FIG. 3 illustrates the logical connection of the elements of the I/O command processing portion of the host bus adapter of FIG. 2.

FIG. 3 illustrates the logical interconnection between the UO command processing components. As discussed above with respect to FIG. 1, the host system 102 includes memory 106 that contains the request queue 110 and the response queue 112. The host system 102 is associated with the bus 114 to facilitate the transfer of data and to communicate with peripheral devices including the host bus adapter 116. The command DMA channel 124 is associated with the first bus 114 to transfer data to and from memory 106. The arbiter 206 is provided between the command DMA channel 124 and the inbound logic 202 and outbound logic 204 units. As briefly discussed above, the arbiter 206 is used to control access to the command DMA channel 124 so as to prevent either logic unit 202, 204 from monopolizing the use of the command DMA channel. The arbiter 206 grants equal access rights to both the inbound logic 202 and the outbound logic 204 by using a round robin arbitration scheme as is well known in the art. Further, the arbiter 206 is used to control access to the first bus 114 by the data DMA channel 126 and the command DMA channel 124 such that neither channel has disproportionate control over the bus.

The inbound logic 202 is associated with a request free list 302 and a request filled list 304. The inbound logic 202 has write access to the request filled list 304. The inbound logic 202 has read only access to the request free list 302. The inbound logic 202 can write information to the adapter RAM 138. The inbound logic 202 is further associated with the mailbox registers 208 to enable the in-bound logic 202 to track pointers to the request queue 110.

The outbound logic 204 is associated with a response free list 306 and a response filled list 308. The outbound logic 204 has read only access to the response filled list 308. The outbound logic 204 has write access to the response free list 306. The outbound logic 204 can read information from the adapter RAM 138. The outbound logic 204 is further associated with the mailbox registers 208 to enable the outbound logic 204 to track pointers to the response queue 112.

The adapter processor 122 is associated with the adapter memory 138 to read I/O commands from request buffers 210 and to write status information to response buffers 212. The adapter processor 122 has write access to the request free list 302 and to the response filled list 308. The adapter processor 122 has read only access to the request filled list 304 and to the response free list 306.

Figure 4:
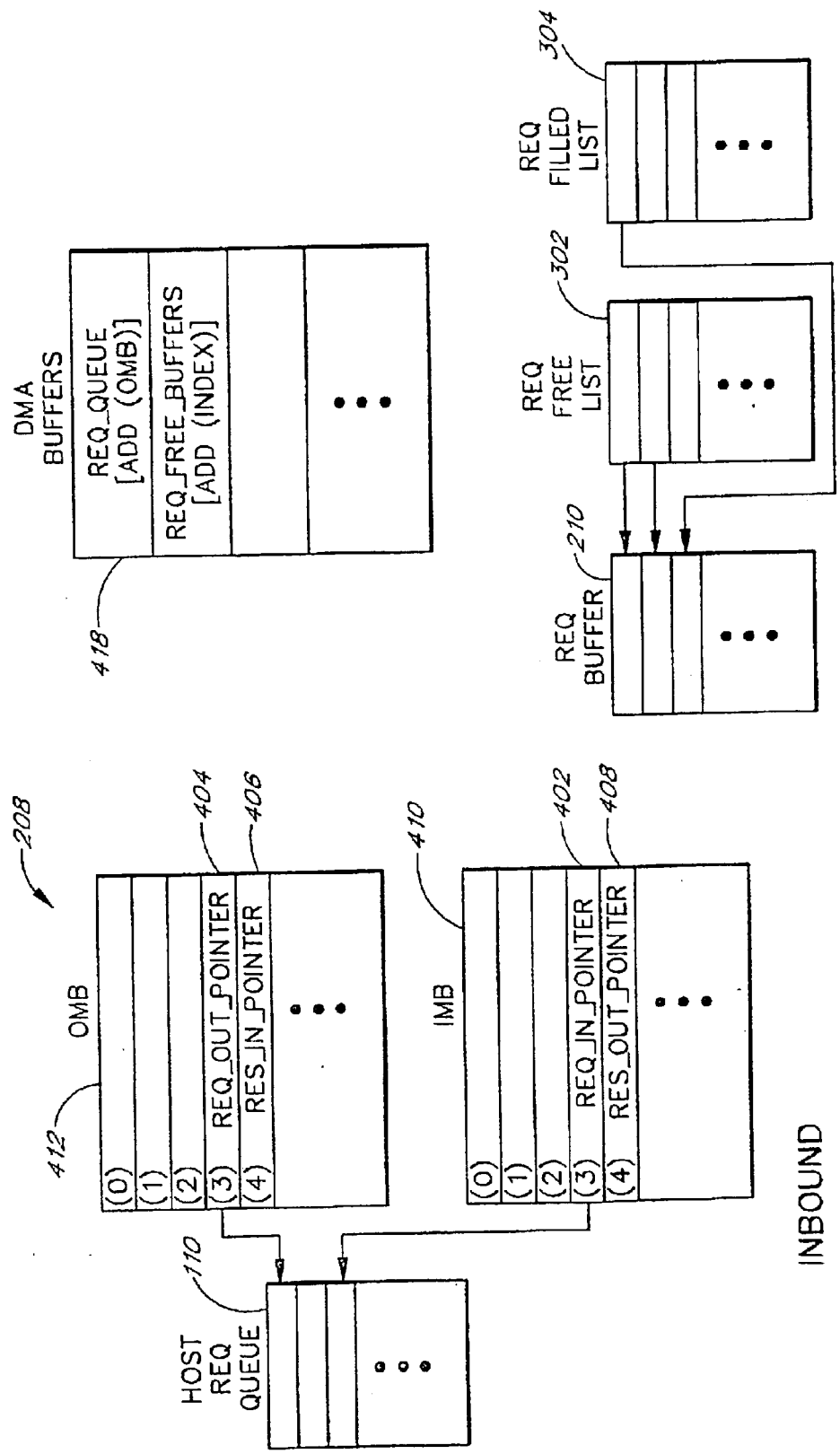
FIG. 4 illustrates the logical relationship between the storage elements associated with an I/O request inbound operation.

FIG. 4 illustrates further details of the logical storage elements used in facilitating the automatic transfer of I/O requests from the request queue 110 to the I/O request buffer area 210 of the adapter RAM 138. The storage elements include the request queue 110, an input mailbox (IMB) register set 410 (input mailbox), an output mailbox (OMB) register set 412 (output mailbox), the request free buffer list 302 (request free list), the request filled buffer list 304 (request filled list), the I/O request buffers 210, and a DMA buffer queue 418.

As discussed above, the request queue 110 is an interface to the host adapter 118 through which the host microprocessor 104 passes I/O requests for the transport of I/O command blocks (IOCBs), which comprise various commands and data. The request queue 110 is advantageously organized as a circular, fixed-length list of first-in-first-out (FIFO) entries. In the illustrated embodiment, the request queue 110 contains 128 entries, with each entry comprising 64 bytes. In alternative embodiments of the present invention, the command and status information is stored in other types of data structures (e.g., stacks) instead of circular queues.

The request queue 110 and the response queue 112 each have an in-pointer and an out-pointer, which are implemented as indices. The firmware of the host bus adapter 116 stores a set of in-pointer variables and out-pointer variables (not shown) in the adapter RAM 138. The host memory 106 uses a set of its own in-pointer variables and out-pointer variables (not shown). Each in-pointer variable and out-pointer variable can be converted to an address which is associated with the address of one of the entries of the queues 110, 112 by using a formula. One such formula can be given by:

Address=Base Address+(frame size×pointer index value).

A determination of whether the request queue 110 is full, empty, or partially full can be made by referring to a request queue in-pointer (REQ_IN_POINTER) 402 in the input mailbox 410 and to a request queue out-pointer (REQ_OUT_POINTER) 404 in the output mailbox 412. The request queue in-pointer 402 points to one entry past the last entry of the request queue 110. The request queue out-pointer 404 points to the first entry of the request queue 110. When the request queue in-pointer 402 is one less than the request queue out-pointer 404 (taking into account a wrap-around condition of a circular queue), the request queue 110 is full. A full request queue 110 contains one entry less than the total length of the queue. When the request queue in-pointer 402 and the request queue out-pointer 404 are equal, the request queue 110 is empty. The number of empty (available) queue entries in the request queue 110 can be calculated by subtracting the request queue in-pointer 402 from the request queue out-pointer 404 (taking into account the wrap-around condition).

The entries of the request queue 110 are queued by the host microprocessor 104, which controls the request queue in-pointer 402 in the input mailbox register set 410. The entries of the request queue 110 are de-queued by the inbound logic (FIG. 5) within the host adapter 118, which controls the request queue out-pointer 404 in the output mailbox register set 412. Each entry in the request queue 110 can hold one IOCB.

FIG. 4 illustrates the internal mailbox registers that are part of the interface registers 120 of FIG. 1. Each mailbox register is preferably 16 bits long. The incoming mailbox registers 410 can be written to by the host microprocessor 104 and can be read from by the host adapter 118. The incoming mailbox registers 410 are used to transfer information from the host microprocessor 104 to the host adapter 118. The outgoing mailbox registers 412 can be written to by the host adapter 118 and can be read from by the host microprocessor 104. The outgoing mailbox registers 412 are used to transfer status information from the host adapter 118 to the host microprocessor 104.

The request free list 302 and the request filled list 304 are used to track the I/O buffers 210 in adapter RAM 138. The request free list 302 and the request filled list 304 are advantageously implemented as FIFO data structures. The request free list 302 contains indices to the request buffers 210 in the RAM 138 where the processor 122 has allocated space for I/O request frames. The base address of the I/O buffers 210 is stored in a register (not shown) that is readable by the inbound logic 202. The inbound logic 202 uses the base address to determine the memory addresses of I/O buffers pointed to by entries in the request free list 302 and by the entries in the request filled list 304. A set of DMA buffers 418 is used by the command DMA channel 124 to store pending DMA requests. The DMA buffers 418 are advantageously implemented as a FIFO structure.

Figure 5:
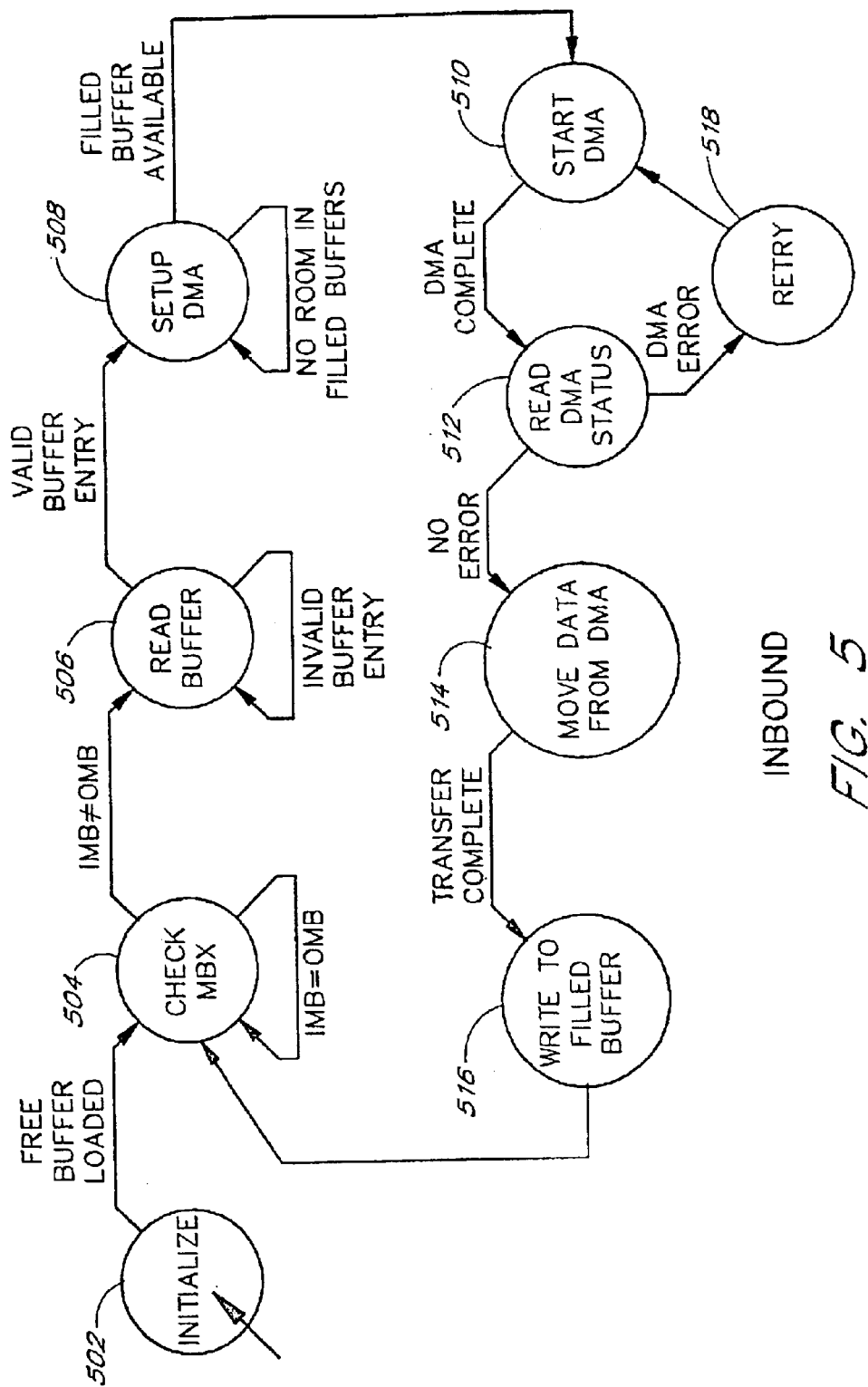
FIG. 5 is a state diagram of the operation of the inbound logic circuit of the present invention.

The operation of the inbound logic 202 is described with reference to FIGS. 1–4 and with reference to the state machine diagram of FIG. 5. The inbound logic 202 starts from the initialization state 502 where it waits for the adapter processor 122 to set up the request free list 302 such that at least one index to an I/O buffer is available. Once the adapter processor 122 loads the request free list 302, the inbound logic 202 moves to a mailbox check state 504.

The host microprocessor 104 then loads one or more IOCBs into the next available entries of the request queue 110, starting with the first available entry designated by the request queue in-pointer variable. The host microprocessor 104 increments its copy of the request queue in-pointer variable by the number of new entries loaded into the request queue 110. The incremented request queue in-pointer variable becomes the address of the next available entry within the request queue 110. The host microprocessor 104 then writes the new value of the incremented request in-pointer variable to the request queue in-pointer 402 in mailbox register 3 of the incoming mailbox register set 410. The inbound logic 202 polls mailbox register 3 of the incoming mailbox set 410. As long as the request in-pointer 402 is equal to the request out-pointer 404 to indicate that the request queue is empty, the inbound logic 202 remains at the mailbox check state 504. Once the request in-pointer 402 is no longer equal to the request out-pointer 404, as is the case after the host writes a new request to the request queue, the inbound logic 202 moves to a read buffer state 506. The inbound logic 202 proceeds to retrieve (and temporarily save) the IOGB from the request queue 110. First, the inbound logic 202 attempts to read an index from the request free list 302 to ascertain whether space is available on adapter RAM 138 for storing the new IOCB. If a valid value is read from the request free list 302, indicating that space is available, the inbound logic 202 moves to a DMA setup state 508. The inbound logic 202 checks to determine whether an entry is available in the request filled list 304 such that there is also space available to provide the address of the 10GB once it is transferred to the request buffer 210. As long as the request filled list 304 is full, the inbound logic 202 waits in the DMA setup stage 508. When space is available in the request filled list 304, the inbound logic 202 moves to a DMA start state 510. The inbound logic 202 initiates the DMA operation by writing a command to the DMA buffer 418. The command includes the host address that was determined from the request out-pointer 404 as the source and includes the size of the 110 request frame as the size.

The inbound logic 202 waits for a "DMA complete" message from the command DMA channel 124. The inbound logic 202 moves to a read DMA status state 512 when a "DMA complete" is communicated from the command DMA channel 124. The inbound logic 202 reads the DMA status from the DMA status register (not shown). If an error occurred, the inbound logic 202 moves to a retry states 518 and notifies the processor 122. The inbound logic 202 moves again to the start DMA state 510 after notifying the processor 122 of the error status. Alternatively, if no error was communicated by the command DMA channel 124, the inbound logic 202 moves to a data move state 514. The adapter processor 122 then increments the request queue out-pointer variable and writes the value to mailbox register 3 of the outgoing mailbox register set 412. The host microprocessor 104 may then read mailbox register 3 of the outgoing mailbox register set 412 to update its copy of the request queue out-pointer. The inbound logic 202 further moves the data from the DMA channel FIFO (not shown) to a request buffer 210, determined from the entry that was earlier read from the request free list 302. When the transfer is complete, the inbound logic 202 moves to a write filled list state 516. The inbound logic 202 then writes the value read from the request free list 302 to the request filled list 304, to indicate the location of the IOCB, and moves again to the mailbox check state 504.

The host adapter 118 processes the IOCB(s) by accessing the second bus 130 and writing or retrieving the requested information to or from the peripheral I/O devices 132–134. In a preferred embodiment, during a read I/O request, the host adapter 118 begins to transfer the retrieved data from the designated I/O device 132–134 directly to locations within the memory 106 (FIG. 1). As can be appreciated from the foregoing description, the processor 122 only needs to read the IOCB from the adapter IOCB buffer area instead of having to set up the transfer of the IOCB from the host system to the host adapter RAM before being able to read the IOCB. With the method of the present invention, the processor uses less processor cycles before processing the IOCBs, thereby increasing its throughput.

Figure 6:
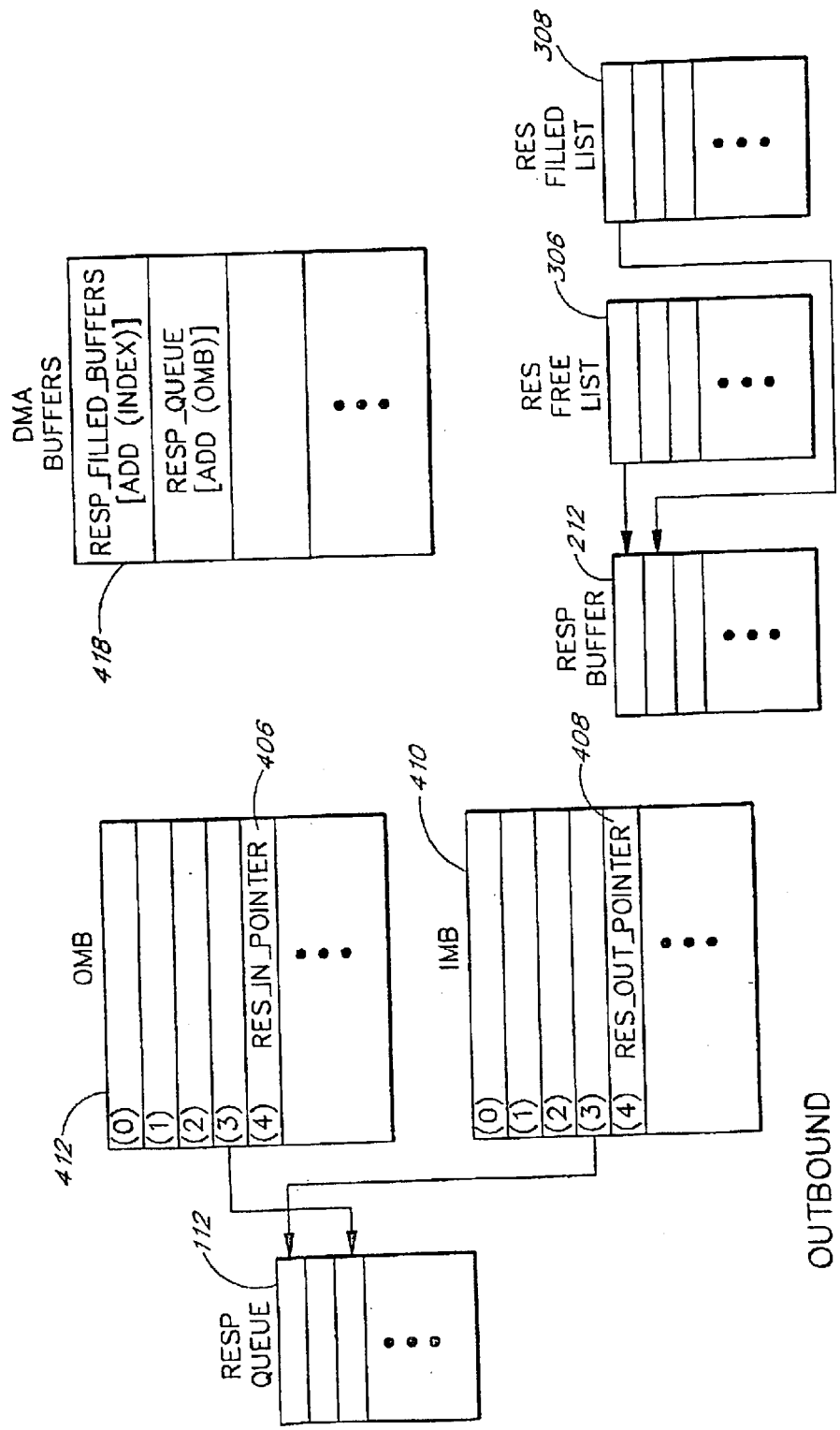
FIG. 6 illustrates the logical relationship between the storage elements associated with an I/O response outbound operation.

FIG. 6 illustrates the logical storage elements used in facilitating the automatic transfer of I/O responses from the adapter RAM 138 to the response queue 112. As was discussed above, the storage elements include the response queue 112, the input mailbox register set 410 (input mailbox), the output mailbox register set 412 (output mailbox), the response free buffer list 306 (response free list), the response filled buffer list 308 (response filled list), the I/O response buffers 212, and the set of DMA buffers 418.

The entries of the response queue 112 are queued by the outbound logic 204 (FIG. 7) within the host adapter 118, which controls the response queue in-pointer 406. The entries of the response queue 112 are de-queued by the host microprocessor 104, which controls the response queue out-pointer 408. Each entry in the response queue 112 can hold one IOSB.

The structure of the response queue 112 is substantially similar to the structure of the request queue 110, with the exception that the response queue 112 is configured to contain I/O status blocks (IOSBs) while the request queue 110 is configured to contain IOCBs. The response queue 112 is an interface to the host microprocessor 104 through which the host adapter 118 passes I/O responses for the transport of IOSBs, which comprise SCSI status and other status information regarding an I/O request. An IOSB contains status information which informs the host microprocessor 104 that an I/O request is complete and which also informs the microprocessor 104 whether or not the I/O request was successful. When I/O command completion information is ready to be processed and retrieved, the host adapter 118 reports to the host microprocessor 104 by writing an entry to the response queue 112. If the completed I/O requests included any read operations, the host microprocessor 104 can then process the data which was retrieved from the I/O device(s) 132–134 and stored within the memory 106. The response queue in-pointer 406 is controlled by the outbound logic 204 such that it is incremented every time a response is written to the response queue 112. The response queue out-pointer 408 is controlled by the host microprocessor 104 such that the response queue out-pointer 408 is incremented every time a response is read from the queue 112.

The response free list 306 and the response filled list 308 are used to track the I/O buffers in the host adapter RAM 138, which contain responses. The response free list 302 and the response filled list 304 are advantageously implemented as FIFO data structures. The response free list 306 contains indices to the response buffers 212 in the RAM 138 where the processor 122 allocated space for I/O responses. The base address of the I/O response buffers 212 is stored in a register (not shown) that is readable by the outbound logic 204. The outbound logic 204 uses the base address to determine the memory location of the I/O buffer pointed to by the entries in the response free list 306 and the response filled list 308.

Figure 7:
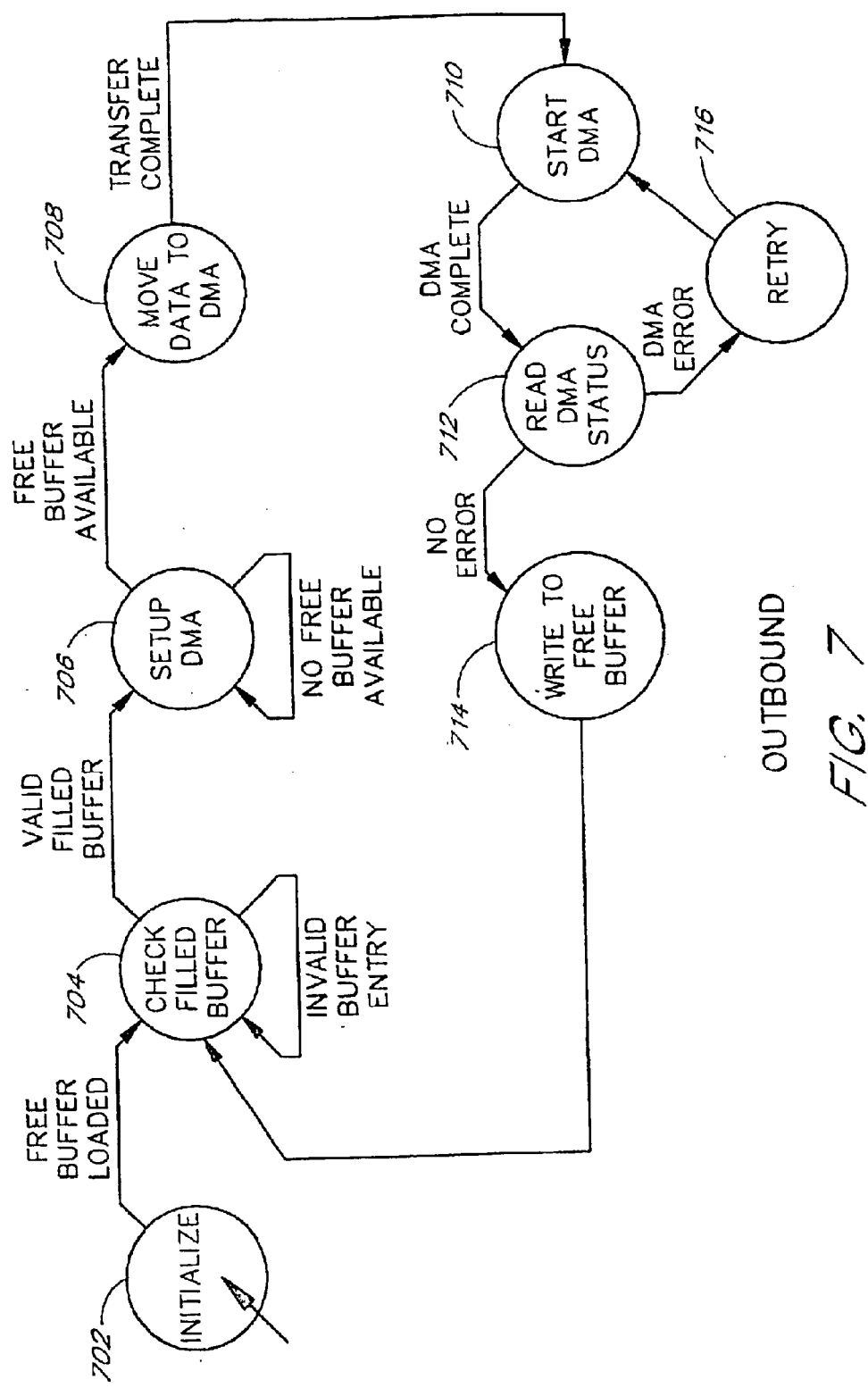
FIG. 7 is a state diagram of the operation of the inbound logic circuit of the present invention.

The operation of the outbound logic 204 is described with reference to FIGS. 1-3, 6, and with reference to the state machine diagram of FIG. 7. The outbound logic 204 starts from the initialization state 702 where it waits for the adapter processor 122 to initialize the response free list 306 such that at least one index to an I/O buffer 212 is available. Once the response free list 306 is loaded, the outbound logic 204 moves to a filled check state 704. The adapter processor 122 loads one or more IOSBs into the RAM 138 in a location pointed to by the next entry in the response free list 306. The adapter processor 122 then writes the index of the buffer into the response filled list 308. The outbound logic 204 checks the response filled list 308 for a valid entry. Once a valid entry is read, which indicates to the outbound logic that a response has been loaded onto a buffer, the outbound logic 204 moves to a DMA setup state 706.

The outbound logic 204 checks to determine whether there is room in the response queue 112 for another entry. The difference between the value of the response queue in-pointer and the value of the response queue out-pointer is used to determine how much space is in the response queue 112. If the response queue 112 has enough room, the outbound logic 204 proceeds to a move data state 708. The data from the location pointed to by the entry in the response filled list 308 is then moved to the DMA channel FIFO (not shown). Once the data is ready in the DMA channel FIFO, the outbound logic 204 moves to a DMA start state 710. The DMA operation is then initiated by providing the address ascertained from the response queue in-pointer as the target, and the response entry size as the size. The outbound logic 204 then moves to the read DMA state 712. If a DMA error is communicated by the DMA status, the outbound logic 204 moves to a retry state 716. The outbound logic 204 moves again to the start DMA state 710 after notifying the processor 122 of the error status. Alternatively, if no error was communicated by the command DMA channel 124, the outbound logic 204 moves to a write free state 714. The outbound logic 204 then writes the index that was read from the response filled list 308 to the response free list 306 to make the buffer available again for the processor 122. The outbound logic 204 then increments the response queue in-pointer and writes the value of the incremented response queue in-pointer into mailbox register 4 of the outgoing mailbox register set 412 for the host microprocessor 104 to read. The outbound logic 204 then moves to the filled check state 704 where it monitors the response filled list 308. The host microprocessor 104 then reads the response queue 112 entry and increments its copy of the response queue out-pointer variable. Once the response queue out-pointer variable and response queue in-pointer variable are equal, the host microprocessor 104 has finished reading all the responses in the response queue 112. Therefore, the adapter processor 112 only needs to write the IOSB to an address retrieved from the response free list 306 and then provide the address to the response filled list 308, without having to actually set up the transfer of the IOSB from the adapter RAM 138 to the host memory 106.

From the description above, it can be appreciated that the inbound and outbound logic units perform several functions that would otherwise be left for the adapter processor 122. The adapter processor 122 does not need to set up the transfer of IOCBs or IOSBs. The IOCBs are automatically loaded onto the adapter RAM 138, allowing the adapter processor 122 to send I/O requests to the data DMA channel at a higher rate. The IOSBs are automatically offloaded from the adapter RAM 138, allowing the adapter processor 122 to process responses at a higher rate. Especially with the increases in I/O device speeds, the offloading of some of the setup work from the adapter processor 122 can significantly improve system performance. Examples of systems that will benefit from this improvement in I/O processing rate include internet servers, RAID servers, database front ends, and other high I/O type computer systems.

The present invention may be practiced regardless of the I/O request workload (either a high workload or a low workload), the type of access (either sequential or random access), the type of system configuration, the number of I/O devices, and the type of I/O requests, either queued or non-queued I/O requests. Alternative embodiments may have a high or low I/O request workload, sequential or random I/O access, a different number of I/O devices, and queued or non-queued I/Os.

Although the invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. A method of automatically transferring an I/O status block from a RAM of a host adapter to a memory of a host system, the method comprising:
providing a response free buffer list in said adapter, said response free buffer list containing indices to buffers in said adapter where an adapter processor has allocated space for I/O responses;
providing a response filled buffer list in said adapter, said response filled buffer list identifying the address of a buffer in said adapter RAM in which said I/O status block is stored and a valid entry indicating that a response has been loaded onto to a buffer in said host adapter RAM; wherein the response free buffer list and response filled buffer list are used to track buffers in the host adapter RAM;
monitoring said response filled buffer list to determine said address of said adapter RAM buffer;
determining if space is available in said host system memory to store said I/O status block by comparing a response queue in pointer controlled by an outbound logic of said adapter with a response queue out pointer controlled by a host system processor;
transferring said I/O status block from said buffer in said adapter RAM to a response queue in said host system memory; and
writing said buffer address to the free buffer list in said adapter.

2. A circuit for automatically transferring an I/O status block from a RAM of a host adapter to a memory of a host system, the circuit comprising:
a response free buffer list in said adapter, said response free buffer list containing indices to buffers in said adapter where an adapter processor has allocated space for I/O responses:
a response filled buffer list in said host adapter, said response filled buffer list identifying the address of a buffer in said adapter RAM in which said I/O status block is stored and a valid entry indicating that a response has been loaded onto to a buffer in said host adapter RAM; wherein the response free buffer list and response filled buffer list are used to track buffers in the host adapter RAM;
a monitoring unit that monitors said response filled buffer list and generates a signal identifying the address of the adapter RAM buffer in which said I/O status block is stored;
means in said adapter for determining if space is available in a response queue in said host system memory to store said I/O status block by comparing a response queue in pointer controlled by an outbound logic of said adapter with a response queue out pointer controlled by a host system processor; and
a data retrieval unit operatively responsive to said monitoring unit signal and said determining means to transfer said I/O status block from said adapter RAM buffer to said response queue in said host system and then write said buffer address to the response free buffer list in said host adapter.

3. The method of claim 1, further comprising:
reading an address of a free response buffer in said adapter RAM from said free response buffer list;
storing an I/O status block in said free response buffer; and
then writing said address of said free response buffer in said filled buffer list as the address of a filled buffer.

4. The circuit of claim 2, further comprising:
a processor in said adapter operatively programmed to:
read an address of a free response buffer in said adapter RAM from said free response buffer list,
write an I/O status block to said free response buffer, and
then write said free response buffer address to said response filled buffer list as the address of a filled buffer.

5. The method of claim 1, wherein transferring said I/O status block from said buffer in said adapter RAM to a response queue in said host system memory is effected without intervention of the processor in said adapter.

6. The circuit of claim 4, wherein said data retrieval unit transfers said I/O status block from said adapter RAM buffer to said response queue without intervention of said adapter processor.

* * * * *